(12) United States Patent
Sano et al.

(10) Patent No.: US 7,867,327 B2
(45) Date of Patent: *Jan. 11, 2011

(54) INK SET FOR INK JET RECORDING AND METHOD FOR INK JET RECORDING

(75) Inventors: Tsuyoshi Sano, Shiojiri (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/154,478

(22) Filed: May 23, 2008

(65) Prior Publication Data

US 2009/0142555 A1 Jun. 4, 2009

(30) Foreign Application Priority Data

May 24, 2007 (JP) ............................... 2007-137582

(51) Int. Cl.
*C09D 11/02* (2006.01)
*B41J 2/01* (2006.01)

(52) U.S. Cl. ..................................... 106/31.6; 347/100

(58) Field of Classification Search ................ 106/31.6; 347/100

See application file for complete search history.

(56) References Cited

U.S. PATENT DOCUMENTS

| | | | |
|---|---|---|---|
| 6,322,188 B1 | 11/2001 | Sano | |
| 6,755,514 B2 | 6/2004 | Koga | |
| 7,063,409 B2 | 6/2006 | Koga | |
| 7,285,592 B2 | 10/2007 | Harz et al. | |
| 7,604,693 B2 * | 10/2009 | Oyanagi et al. | 106/31.6 |
| 7,670,418 B2 * | 3/2010 | Kato et al. | 106/31.6 |
| 2006/0229382 A1 | 10/2006 | Schweikart et al. | |
| 2006/0268084 A1 | 11/2006 | Nishizaki et al. | |
| 2007/0022547 A1 | 2/2007 | O'Brien | |
| 2007/0120926 A1 | 5/2007 | Doumaux et al. | |
| 2007/0129457 A1 * | 6/2007 | Nakano et al. | 522/1 |
| 2008/0173214 A1 * | 7/2008 | Oyanagi et al. | 106/31.25 |
| 2008/0182083 A1 * | 7/2008 | Oyanagi et al. | 428/195.1 |
| 2008/0182085 A1 * | 7/2008 | Oyanagi et al. | 428/195.1 |
| 2008/0233362 A1 * | 9/2008 | Kato et al. | 106/31.6 |
| 2009/0110827 A1 * | 4/2009 | Nakano et al. | 427/256 |
| 2009/0169834 A1 * | 7/2009 | Sano et al. | 106/31.6 |
| 2010/0062161 A1 * | 3/2010 | Shiono et al. | 106/31.77 |

FOREIGN PATENT DOCUMENTS

| | | |
|---|---|---|
| CN | 1398724 A1 | 10/2000 |
| CN | 1529740 A | 9/2004 |
| CN | 1771307 A | 5/2006 |
| EP | 1045013 A1 | 10/2000 |
| EP | 1422072 A1 | 5/2004 |
| EP | 1892105 A1 | 2/2008 |
| GB | 2367299 A | 4/2002 |
| JP | 10-120956 | 5/1998 |
| JP | 2000-345080 | 12/2000 |

* cited by examiner

*Primary Examiner*—Helene Klemanski
(74) *Attorney, Agent, or Firm*—Nutter McClennen & Fish LLP

(57) ABSTRACT

There is provided an ink set for ink jet recording, which can realize lightfastness and waterfastness and, at the same time, can realize good images, especially images having a good hue. The ink set for ink jet recording comprises a cyan ink composition, a magenta ink composition, and a yellow ink composition, wherein the cyan ink composition comprises as a colorant at least one pigment selected from the group consisting of C.I. Pigment Blue 15:3 and C.I. Pigment Blue 15:4, the magenta ink composition comprises as a colorant at least one pigment selected from group consisting of C.I. Pigment Red 122, C.I. Pigment Red 202, C.I. Pigment Red 209, and C.I. Pigment Violet 19, and the yellow ink composition comprises as a colorant C.I. Pigment Yellow 213.

7 Claims, No Drawings

INK SET FOR INK JET RECORDING AND METHOD FOR INK JET RECORDING

BACKGROUND OF THE INVENTION

1. Field of the Invention

The present invention relates to an ink set for ink jet recording, comprising a cyan ink composition, a yellow ink composition, and a magenta ink composition, and a method for ink jet recording, comprising depositing a reaction solution and an ink composition onto a recording medium to perform printing.

2. Background Art

Ink jet recording is a printing method wherein droplets of an ink composition are flied and deposited on recording media such as paper to perform printing. This method has a feature that high-resolution and high-quality images can be printed at a high speed with a relatively inexpensive apparatus.

Ink compositions for use in ink jet recording generally comprise water as a main component and a colorant component and a wetting agent such as glycerin, for example, for clogging preventive purposes, added to the water. Water soluble dyes have hitherto been extensively used as the colorant for the ink composition for ink jet recording, for example, from the viewpoints of their high level of chroma, their abundance of usable types, and their solubility in water.

On the other hand, dyes are sometimes poor in various properties such as lightfastness and waterfastness. Accordingly, printed matters printed using dye-based ink compositions have poor lightfastness and waterfastness. The waterfastness has been improved by using ink jet specialty recording paper comprising an ink adsorptive layer. However, it is difficult to say that the waterfastness of printed matter using plain paper is satisfactory.

Pigments are superior in lightfastness and waterfastenss to dyes, and studies have recently been made on the utilization of pigments as a colorant for an ink composition for ink jet recording, from the viewpoint of improving the lightfastness and waterfastness. Pigments are generally insoluble in water. Accordingly, when pigments are used in a water-based ink composition, prior to the preparation of an ink composition, the step of mixing the pigment with a resin called a dispersant and the like and adding the mixture to water to stably disperse the mixture in water should be provided.

Further, when the utilization of pigments as a colorant for inks for ink jet recording is taken into consideration, pigments are superior in lightfastness and waterfastness to dyes, but on the other hand, the number of types of usable coloring materials is smaller than that in pigments. When pigments are actually utilized as an ink for ink jet recording, in addition to lightfastness and waterfastness, hue should also be satisfactorily studied. For example, Japanese Patent Laid-Open No. 345080/2000 proposes a yellow ink composition comprising a combination of a specific pigment having excellent lightfastness and two specific pigments having excellent color development. Further, Japanese Patent Laid-Open No. 120956/1998 proposes an ink set comprising a combination of specific pigment-containing cyan, magenta, and yellow ink compositions, which ink set can realize good images excellent in lightfastness and waterfastness, as well as in particularly hue.

SUMMARY OF THE INVENTION

The present inventors have now found that, in a method for color ink jet recording, the use of an ink set comprising a combination of specific pigment-containing yellow Ink composition, magenta ink composition, and cyan ink composition can realize good images excellent in lightfastness and waterfastness, as well as in particularly hue, without the need to use a plurality of pigments as a yellow ink pigment. The present invention has been made based on such finding.

Accordingly, an object of the present invention is to provide an ink set for ink jet recording, which can realize good images excellent in lightfastness and waterfastness, as well as in particularly hue.

The above object can be attained by an ink set for ink jet recording according to the present invention, comprising a cyan ink composition, a magenta ink composition, and a yellow ink composition, wherein the cyan ink composition comprises as a colorant at least one pigment selected from the group consisting of C.I. Pigment Blue 15:3 and C.I. Pigment Blue 15:4, the magenta ink composition comprises as a colorant at least one pigment selected from group consisting of C.I. Pigment Red 122, C.I. Pigment Red 202, C.I. Pigment Red 209, and C.I. Pigment Violet 19, and the yellow ink composition comprises as a colorant C.I. Pigment Yellow 213.

According to another aspect of the present invention, there is provided a method for ink jet recoding, comprising the step of ejecting droplets of an ink composition and depositing the droplets onto a recording medium to perform printing, wherein at least one ink composition contained in the above ink set is used.

According to the present invention, good images excellent in lightfastness and waterfastness, as well as in particularly hue can be realized.

DETAILED DESCRIPTION OF THE INVENTION

The ink set according to the present invention comprises a cyan ink composition, a magenta ink composition, and a yellow ink composition, and each of these ink compositions contains a specific pigment as a colorant. Each ink composition constituting the ink set according to the present invention will be described.

Yellow Ink Composition

The yellow ink composition for the ink set according to the present invention contains C.I. Pigment Yellow 213 as a colorant. The use of this yellow pigment-containing yellow ink composition in combination with a magenta ink composition and a cyan ink composition which will be described later can realize good images excellent in lightfastness and waterfastness, as well as in particularly hue. In particular, it should be noted that, according to the present invention, mere use of a yellow ink composition containing only C.I. Pigment Yellow 213 as a yellow pigment can provide images excellent in lightfastness and waterfastness, as well as in particularly hue, without use of a plurality of yellow pigments, for example, a combination of a yellow pigment having excellent lightfastness (for example, C.I. Pigment Yellow 128 or C.I. Pigment Yellow 110) with a yellow pigment having excellent color development (for example, C.I. Pigment Yellow 74). This is surprising and an advantage of the present invention. Further, since there is no need to use a yellow ink composition containing a plurality of pigments, the present invention is also advantageous in that the preparation of an ink composition and the practice of ink jet recording are used in simple.

The yellow ink composition used in the present invention comprises at least water together with the above pigment. The amount of the pigment added to the cyan ink composition may be properly determined in such an amount range that can realize good images excellent in lightfastness and waterfastness, as well as in hue. Preferably, however, the addition amount of the pigment is, for example, not more than 6% by weight.

The above pigment is preferably added, to an ink composition, as a pigment dispersion produced by dispersing the pigment in an aqueous medium with the aid of a dispersant or a surfactant. Preferred dispersants include dispersants which have been commonly used for the preparation of pigment dispersion liquids, for example, polymer dispersants.

In a preferred embodiment of the present invention, the cyan ink composition comprises an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time necessary for drying the ink composition.

In a preferred embodiment of the present invention, the ink composition used in the present invention preferably further comprises a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, for example, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the low-boiling organic solvent added is preferably 0.5 to 10% by weight, more preferably 1.5 to 6% by weight, based on the ink composition. The amount of the high-boiling organic solvent added is preferably 0.5 to 40% by weight, more preferably 2 to 20% by weight, based on the ink composition.

In a preferred embodiment of the present invention, the cyan ink composition according to the present invention may comprise a surfactant. Preferred surfactants include, for example, anionic surfactants (for example, sodium dodecylbenzenesulfonate, sodium laurylate, and ammonium salts of polyoxyethylene alkyl ether sulfates), and nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used either solely or as a mixture of two or more. Further, acetylene glycols (OLFINE Y, Surfynol 82, Surfynol 104, Surfynol 440, Surfynol 465, and Surfynol 485 (all the above products being manufactured by Air Products and Chemicals Inc.) may also be used.

In a preferred embodiment of the present invention, the yellow ink composition according to the present invention contains a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, acryl/styrene resin, butadiene resin, styrenic resin, crosslinked acrylic resin, crosslinked styrene resin, benzoguanamine resin, phenolic resin, silicone resin, and epoxy resin.

In a preferred embodiment of the present invention, the resin is a polymer that has a hydrophilic moiety and a hydrophobic moiety in combination. The particle diameter of the resin component is not particularly limited so far as an emulsion is formed. Preferably, however, the particle diameter is about not more than 150 nm, more preferably about 5 to 100 nm.

These resin emulsions may be produced by dispersion polymerizing a resin monomer optionally together with a surfactant in water. For example, an emulsion of an acrylic resin or a styrene-acrylic resin can be prepared by dispersion polymerizing an (meth)acrylic ester or a combination of an (meth)acrylic ester with styrene together with a surfactant in water. In general, the mixing ratio between the resin component and the surfactant is preferably about 10:1 to 5:1. When the amount of the surfactant used is in the above-defined range, better waterfastness and penetrability can be imparted to the ink composition. The surfactant is not particularly limited, and preferred examples thereof include the above-described surfactants.

The ratio between the resin as the dispersed phase component and water is preferably 60 to 400 parts by weight, more preferably 100 to 200 parts by weight, of water based on 100 parts by weight of the resin.

When a resin emulsion is used as the thermoplastic resin, a conventional resin emulsion may also be used. For example, resin emulsions described, for example, in Japanese Patent Publication No. 1426/1987, Japanese Patent Laid-Open No. 56573/1991, Japanese Patent Laid-Open No. 79678/1991, Japanese Patent Laid-Open No. 160068/1991 or Japanese Patent Laid-Open No. 18462/1992 as such may be used.

Commercially available resin emulsions may also be used. Examples thereof. Include Microgel E-1002 and Microgel E-5002 (styrene-acrylic resin emulsion; manufactured by Nippon Paint Co., Ltd.), Voncoat 4001 (acrylic resin emulsion; manufactured by Dainippon Ink and Chemicals, Inc.), Voncoat 5454 (styrene-acrylic resin emulsion; manufactured by Dainippon Ink and Chemicals, Inc.), SAE-1014 (styrene-acrylic resin emulsion; manufactured by Zeon Corporation), or Saivinol SK-200 (acrylic resin emulsion; manufactured by Saiden Chemical Industry Co., Ltd.).

The cyan ink composition according to the present invention preferably contains the resin emulsion in such an amount that the content of the resin component in the ink composition is 0.1 to 40% by weight, more preferably 1 to 25% by weight. The resin emulsion has the effect of suppressing the penetration of the colorant component and promoting the fixation of the colorant component onto the recording medium. Some types of resin emulsions can form a film on an ink image surface on the recording medium and can improve the abrasion resistance of the printed matter.

In a preferred embodiment of the present invention, the ink composition contains a thermoplastic resin in a resin emulsion form. The thermoplastic resin used has a softening temperature of 50° C. to 250° C., preferably, 60° C. to 200° C. The term "softening temperature" as used herein means the lowest temperature among the glass transition point, melting point, temperature at which the viscosity coefficient is $10^{11}$ to $10^{12}$ poises, pour point, and minimum film forming temperature (MFT) in the case of a resin emulsion form for thermoplastic resin. In the step of heating in the method according to the present invention, the recording medium is heated at a temperature at or above the softening temperature of the thermoplastic resin.

Preferably, these resins form a highly waterfast and abrasion resistant film upon cooling after heating to a temperature at or above the softening or melting temperature.

Specific examples of water-insoluble thermoplastic resins include, but are not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, a polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, a rosin resin, polyethylene, a polycarbonate, a vinylidene chloride resin, a cellulosic resin, a vinyl acetate resin, an ethylene/vinyl acetate copolymer, a vinyl acetate/acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

In a preferred embodiment of the present invention, the cyan ink composition according to the present invention may contain a saccharide. Examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. Here the term "polysaccharide" used herein means saccharides in the broad sense as including substances which exist widely in the world of nature, such as alginic acid, α-cyclodextrin and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars, Sugar alcohols are particularly preferred, and specific examples thereof include maltitol and sorbit.

The content of these saccharides is preferably 0.1 to 40% by weight, more preferably 0.5 to 30% by weight, based on the ink composition.

If necessary, other additives such as pH adjustors, preservatives, and antimolds may be added.

Magenta Ink Composition

The magenta ink composition for the ink set according to the present invention comprises as a colorant at least one pigment selected from the group consisting of C.I. Pigment Red 122, C.I. Pigment Red 202, C.I. Pigment Red 209, and C.I. Pigment Violet 19. Good images excellent in lightfastness and waterfastness, as well as in particularly hue can be realized by using the magenta ink composition containing the specific magenta pigment in combination with the yellow ink composition and a cyan ink composition which will be described later.

The magenta ink composition constituting the ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the magenta ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymer dispersants.

As with the yellow ink composition, the magenta ink composition according to the present invention preferably contains, for example, an organic solvent, a surfactant, a resin emulsion, a saccharine, a pH adjustor, a preservative, and an antimold. Specific examples and the addition amount thereof may be the same as those in the yellow ink composition.

Cyan Ink Composition

The cyan ink composition for the ink set according to the present invention comprises as a colorant at least one pigment selected from the group consisting of C.I. Pigment Blue 15:3 and C.I. Pigment Blue 15:4. Good images excellent in lightfastness and waterfastness, as well as in particularly hue can be realized by using the cyan Ink composition containing the specific cyan pigment in combination with the yellow ink composition and the magenta ink composition.

The cyan ink composition constituting the Ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the cyan ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymer dispersants.

As with the yellow ink composition, the cyan Ink composition according to the present invention preferably contains, for example, an organic solvent, a surfactant, a resin emulsion, a succharide, a pH adjustor, a preservative, and an antimold. Specific examples and the addition amount thereof may be the same as those in the yellow ink composition.

Ink Set

The ink set according the present invention comprises the above ink compositions. In the present invention, preferably, the concentration of the cyan pigment in the cyan ink composition and the concentration of the magenta pigment in the magenta ink composition are lower than the concentration of the yellow pigment in the yellow ink composition. The color reproduction of images can be further improved by bringing the concentration of the cyan pigment and the concentration of the magenta pigment to a smaller value than the concentration of the yellow pigment.

Further, in the present invention, preferably, the concentration of the magenta pigment in the magenta ink composition is larger than the concentration of the cyan pigment in the cyan ink composition, and the concentration of the yellow pigment in the yellow ink composition is larger than the concentration of the magenta pigment in the magenta ink composition. When the yellow ink composition, the magenta ink composition, and the cyan ink composition have the highest pigment concentration, the next highest pigment concentration, and the lowest pigment concentration, respectively, better color reproduction can be realized.

In a preferred embodiment of the present invention, in the ink set according to the present invention, the concentration of the pigment in all the ink compositions is not more than 6% by weight, and the ratio among the concentration (% by weight) of the pigment in the cyan ink composition, the concentration (% by weight) of the pigment in the magenta ink composition, and the concentration (% by weight) of the pigment in the yellow ink composition are preferably pigment concentration of cyan ink composition pigment concentration of magenta ink composition:pigment concentration of yellow ink composition=2.0 to 5.0:2.5 to 5.5:3.5 to 6.0, more preferably, 2.5 to 5.0:3.5 to 5.5:4.0 to 6.0. According to this embodiment, images having a better hue can be realized.

The ink set according to the present invention may be an ink set for color recording, comprising the above-described individual ink compositions and other additional ink composition(s). In this case, so far as the effect of the present invention as an ink set is not scarified, for example, the type of the additional ink compositions is not particularly limited, and ink compositions commonly used for conventional ink jet recording may be used.

Other color ink compositions, which may be included in the ink set, include light cyan, light magenta, dark yellow, red, green, blue, orange, and violet ink compositions. The "light magenta" ink composition and the "light cyan" ink composition are respectively magenta ink composition and cyan ink composition each of which the colorant concentration has been lowered generally from the viewpoint of improving the quality of printed images by density modulation. The "dark yellow" ink composition is a yellow ink composition which uses a colorant (a pigment) having lower lightness and chroma than the yellow ink composition from the viewpoint of improving the color reproduction of a dark color, for example, in a shadow part. The "red," "orange," "green," "blue," and "violet" ink compositions are ink compositions used as respective elements for constituting intermediate colors of yellow, magenta, and cyan from the viewpoint of improving the color reproduction range.

The ink set according to the present invention may be constituted in the same manner as in the conventional ink set and may be utilized as inks in various conventional recording methods. In particular, in the present invention, high-resolution and high-quality images can be printed at a high speed with a relatively inexpensive apparatus. Accordingly, the ink set according to the present invention is suitable for ink jet recording, that is, for applications where ink droplets are flied and deposited on recording media such as paper to perform printing.

Method for Ink Jet Recording

The method for ink jet recording using the ink set according to the present invention comprises ejecting droplets of the ink composition and depositing the droplets onto a heated recording medium to perform printing. Examples of methods for ejecting droplets of each ink composition include a method wherein an electric signal is converted to a mechanical signal using an electrostrictive element to Intermittently eject ink reservoired in a nozzle head section, thereby recording letters or symbols on the surface of a recording medium, and a method wherein ink, reservoired in a nozzle head section, in its portion very close to the ejection portion is rapidly heated to create a bubble and the ink is intermittently ejected by volume expansion created by the bubble to record letters or symbols on the surface of a recording medium. In a preferred embodiment of the present invention, the ink set is used in the ink jet recoding method using an electrostrictive element. The ejection of liquid droplets of each ink composition is preferably carried out by a recording head which ejects ink droplets through the utilization of mechanical action of a piezoelectric element.

Further, according to the present invention, there is also provided a recorded matter recorded by the above recording method.

EXAMPLES

The following Examples further illustrate the present invention. However, it should be noted that the present invention is not limited to these Examples.

Preparation of Ink Compositions

Ingredients were mixed together according to the formulations shown in Table 1, and the mixtures were filtered through a 10-μm membrane filter to prepare inks. The numerical values in the table represent the contents (% by weight) of respective ingredients in the inks.

TABLE 1

| | | Yellow ink composition | | | | Magenta ink composition | | | | | Cyan ink composition | | |
|---|---|---|---|---|---|---|---|---|---|---|---|---|---|
| Ink No. | | Y1 | Y2 | Y3 | Y4 | M1 | M2 | M3 | M4 | M5 | C1 | C2 | C3 |
| Yellow pigment | C.I. PY 213 | 5.50 | — | — | — | — | — | — | — | — | — | — | — |
| | C.I. PY 74 | — | 5.50 | — | — | — | — | — | — | — | — | — | — |
| | C.I. PY 128 | — | — | 5.50 | — | — | — | — | — | — | — | — | — |
| | C.I. PY 110 | — | — | — | 5.50 | — | — | — | — | — | — | — | — |
| Magenta pigment | C.I. PR 122 | — | — | — | — | 5.00 | 6.00 | — | — | — | — | — | — |
| | C.I. PR 202 | — | — | — | — | — | — | 5.00 | — | — | — | — | — |
| | C.I. PR 209 | — | — | — | — | — | — | — | 5.00 | — | — | — | — |
| | C.I. PV 19 | — | — | — | — | — | — | — | — | 5.00 | — | — | — |
| Cyan pigment | C.I. PB 15:3 | — | — | — | — | — | — | — | — | — | 4.00 | 6.00 | — |
| | C.I. PB 15:4 | — | — | — | — | — | — | — | — | — | — | — | 4.00 |
| Dispersant | | 1.40 | 1.40 | 1.40 | 1.40 | 1.30 | 1.10 | 1.30 | 1.30 | 1.30 | 1.00 | 1.10 | 1.00 |
| Glycerin | | 15.00 | 15.00 | 15.00 | 15.00 | 16.00 | 17.00 | 16.00 | 16.00 | 16.00 | 18.00 | 17.00 | 18.00 |
| 1,2-Hexanediol | | 5.00 | 5.00 | 5.00 | 5.00 | 5.00 | 5.00 | 5.00 | 6.00 | 5.00 | 5.00 | 5.00 | 5.00 |
| BYK-348 | | 0.50 | 0.50 | 0.50 | 0.50 | 0.50 | 0.50 | 0.50 | 0.50 | 0.50 | 0.50 | 0.50 | 0.50 |
| Triethanolamine | | 0.90 | 0.90 | 0.90 | 0.90 | 0.90 | 0.90 | 0.90 | 0.90 | 0.90 | 0.90 | 0.90 | 0.90 |
| Pure water | | Balance | Balance | Balance | Balance | Balance | Balance | Balance | Balance | Balance | Balance | Balance | Balance |

*Dispersant: Styrene-acryl copolymer ammonium salt (molecular weight 7000, resin component 38%)

Evaluation 1: Color Development

For the individual yellow ink compositions of Production Examples Y1 to Y4 thus obtained, the color development was evaluated as follows. Full density blotted images of 100% duty in a size of 5 cm×5 cm were printed on photo paper ("Kotaku (Gloss)," manufactured by Seiko Epson Corporation) with an ink jet printer PX-A650 (manufactured by Seiko Epson Corporation). The color development of the printed matters thus obtained was measured with Spectrolino (manufactured by Gretag Macbeth).

Colorimetric measurement was carried out by L*a*b* measurement by a color difference indication method specified in CIE. Next, the chroma C* was calculated by the following calculation formula, and the color development was evaluated according to the following criteria.

$$C^* = ((a^*)^2 + (b^*)^2)^{1/2}$$

M: C* value of not less than 105
A: C* value of not less than 100 and less than 105
B: C* value of not less than 95 and less than 100
C: C* value of less than 95

Evaluation 2: Lightfastness

For the individual yellow ink compositions of Production Examples Y1 to Y4 thus obtained, printing was carried out in the same manner as described above, except that the duty was regulated so that the OD value was 1.0. The printed matters thus obtained were introduced into a chamber in a lightfast testing machine (fluorescent lamp lightfast testing machine, manufactured by Suga Test Instruments Co., Ltd.) and were allowed to stand in an environment of temperature 24° C. and humidity 60% for 30 days, followed by colorimetric measurement of the printed matter to calculate the percentage retention of the OD value of the printed matter immediate after printing. The fluorescent lamp lightfast testing machine used consisted of 60 fluorescent lamps and can be used for an exposure test in which the illuminance of the printed face was regulated at 70000 luxes.

The lightfastness was evaluated according to the following criteria.
AA: not less than 95%
A: not less than 85%
B: not less than 70%
C: less than 70%

The results of the evaluation were as described in Table 2.

TABLE 2

| Ink No. | Color development | Lightfastness |
|---------|-------------------|---------------|
| Y1      | A                 | A             |
| Y2      | AA                | C             |
| Y3      | C                 | AA            |
| Y4      | B                 | AA            |

Evaluation 3: Color Reproduction

The individual ink compositions thus obtained were combined as shown in Table 3 to constitute ink sets A to 1. For each ink set, specialty output patterns of 400 patches were printed with the ink jet printer as described above. For all the printed matters thus obtained, the colorimetric measurement of the patches was carried out, and the volume in a 3D space of L*a*b* was calculated by a computation tool. The Gumat volume determined by the calculation is nondimensional. The color reproduction was evaluated by the determined Gumat volume value according to the following criteria.

A: not less than 670,000
B: not less than 640,000 and less than 670,000
C: not less than 620,000 and less than 640,000
D: not less than 620,000

The results of evaluation were as described in Table 3.

TABLE 3

| Ink set | Ink composition | | | Color reproduction | |
|---------|--------|---------|------|---------------|------------|
|         | Yellow | Magenta | Cyan | Gamut volume  | Evaluation |
| A | Y1 | M1 | C1 | 670,000 | A |
| B | Y3 | M1 | C1 | 680,000 | A |
| C | Y4 | M1 | C1 | 600,000 | D |
| D | Y5 | M1 | C1 | 610,000 | D |
| E | Y1 | M2 | C1 | 680,000 | A |
| F | Y1 | M3 | C1 | 660,000 | B |
| G | Y1 | M4 | C1 | 660,000 | B |
| H | Y1 | M5 | C1 | 680,000 | A |
| I | Y1 | M1 | C2 | 670,000 | A |
| J | Y3 | M5 | C1 | 690,000 | A |

What is claimed is:

1. An ink set for Ink jet recording, comprising a cyan ink composition, a magenta ink composition, and a yellow ink composition, wherein the cyan ink composition comprises as a colorant at least one pigment selected from the group consisting of C.I. Pigment Blue 15:3 and C.I. Pigment Blue 15:4, the magenta ink composition comprises as a colorant at least one pigment selected from group consisting of C.I. Pigment Red 122, C.I. Pigment Red 202, C.I. Pigment Red 209, and C.I. Pigment Violet 19, and the yellow ink composition comprises as a colorant C.I. Pigment Yellow 213, wherein the cyan, magenta, and yellow ink compositions are water-based ink compositions.

2. The ink set according to claim 1, wherein the concentration of the cyan pigment in the cyan ink composition and the concentration of the magenta pigment in the magenta ink composition are lower than the concentration of the yellow pigment in the yellow ink composition.

3. The ink set according to claim 1 or 2, wherein the concentration of the magenta pigment in the magenta ink composition is larger than the concentration of the cyan pigment in the cyan ink composition, and the concentration of the yellow pigment in the yellow ink composition is larger than the concentration of the magenta pigment in the magenta ink composition.

4. The ink set according to claim 1, wherein at least one ink composition selected from group consisting of the cyan ink composition, the magenta ink composition, and the yellow ink composition further comprises a resin emulsion.

5. The ink set according to claim 1, wherein the concentration of the pigment in all the ink compositions is not more than 6% by weight, and the ratio among the concentration (% by weight) of the pigment in the cyan ink composition, the concentration (% by weight) of the pigment in the magenta ink composition, and the concentration (% by weight) of the pigment in the yellow ink composition are pigment concentration of cyan ink composition:pigment concentration of magenta ink composition pigment concentration of yellow ink composition=2.0 to 5.0:2.5 to 5.5:3.5 to 6.0.

6. A method for ink jet recording, comprising the step of ejecting droplets of an ink composition from an ink set according to claim l and depositing the droplets onto a recording medium to perform printing.

7. A recorded matter printed by a method for ink jet recording according to claim 6.

* * * * *